(No Model.)

H. A. ALDEN & J. E. KIRK.
HORSE HAY RAKE.

No. 355,674. Patented Jan. 11, 1887.

Witnesses,
Luther M. Thurlow
Arthur Keithley

Inventors,
Horace A. Alden,
John E. Kirk;
by A. B. Upham,
Their Attorney.

United States Patent Office.

HORACE A. ALDEN AND JOHN E. KIRK, OF PEORIA, ILLINOIS.

HORSE HAY-RAKE.

SPECIFICATION forming part of Letters Patent No. 355,674, dated January 11, 1887.

Application filed May 20, 1886. Serial No. 202,708. (No model.)

*To all whom it may concern:*

Be it known that we, HORACE A. ALDEN and JOHN E. KIRK, both of Peoria, in the county of Peoria, State of Illinois, have invented certain new and useful Improvements in Hay-Rakes; and we do hereby declare that the following is a full, clear, and exact description thereof.

This invention is in the line of hay-rakes in which the teeth project in front of a wheel-supported frame to which another frame is hinged, this latter frame being provided with a lever and a rod joining the lever to the rake-frame, whereby the rake-teeth can be raised and lowered.

The improvements which form the subject-matter of this application relate to means whereby the rod connecting the operating-lever and the rake-frame can be instantly detached at one of its points of connection to the said lever and rake-frame, so that the two frames can oscillate independently, and also to means for instantly reattaching said points, or making such points of attachment at any place along the rod.

Figure 1:
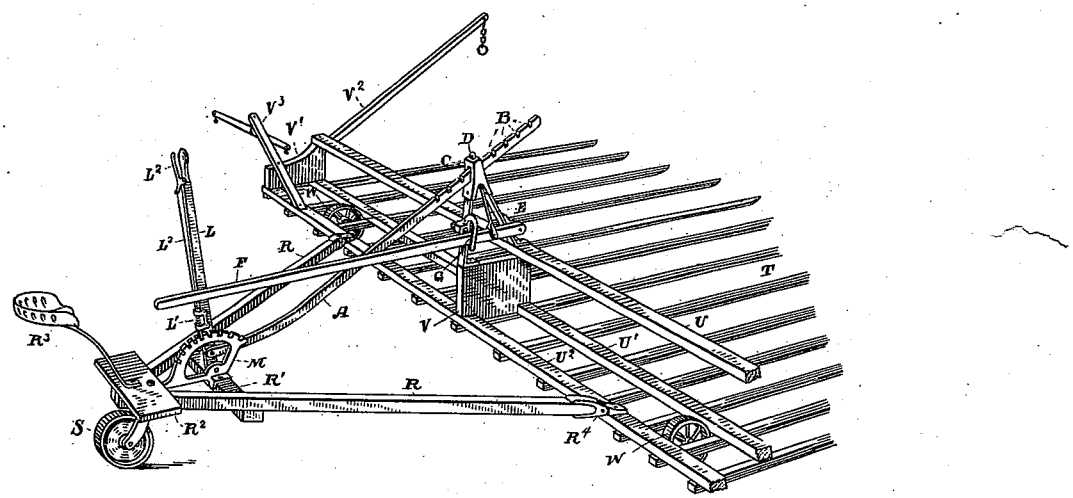
Figure 2:
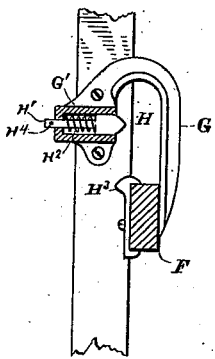
Figure 3:
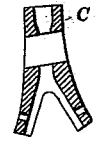
Figure 4:
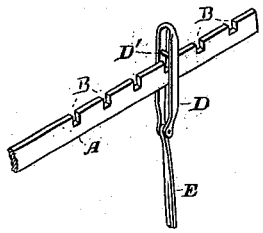
Figure 5:
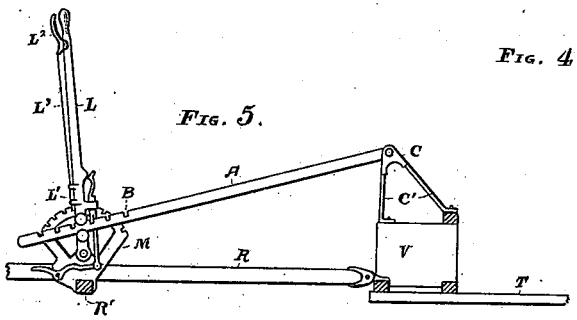
Figure 6:
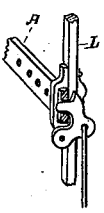

In the drawings connected with this application, Figure 1 is a perspective view of a portion of the rake, together with the frame hinged thereto and the mechanism for raising and lowering the teeth. Figs. 2, 3, and 4 are detail views, on a larger scale, of portions of the invention. Fig. 5 is a side view of a modified form of the means for connecting and disconnecting the rod aforesaid. Fig. 6 is a view of still another modification of the same.

In the drawings, T represents the teeth of the rake projecting in front of the rake-frame, of which are shown the beams U, U', and U² and the center block, V. The rear of the rake is supported by the wheels W W. Hinged to the rake, and projecting behind the same, is the frame R R, having the supporting-wheel S at its rear end.

R³ represents the seat for the driver.

The operating-lever L is pivoted to the notched segment-iron M, mounted upon the frame R, and said lever is secured at different positions by means of the draw-bolt L', engaging with said notches, and the grip-lever L², connected with said draw-bolt by the rod L³. Pivoted to said operating-lever L is the rod A, the other end of which passes through the slide-bearing C, which is held by the standards C' C', projecting from the rake-frame. In an edge of the rod A are several notches, B, and in the slide-bearing C is a yoke, D, about said rod, and having a cross-pin, D', for engaging with the notches B. A link, E, connected to said yoke and to the lever F, enables said yoke to be vertically moved by the raising and lowering of the said lever F, and the rod A to be thereby held in the slide-bearing at any of the notches B.

To retain the lever F in either position that locks and unlocks the rod A, we construct the following: The lever F being pivoted at its extremity to the front bar of the two standards C', the rear bar is provided with the guide-arm G, for keeping the lever F snug against said bar, and there is further provided the plunger H, elastically repressible in the chamber G'. The lip H³, connected to the lever F, and adapted to be engaged with said plunger, enables the said lever F to be held in its elevated position and the cross-pin D' of the yoke D to be retained out of contact with the notches B of the rod A.

To press the plunger H out into contact with the lip H³, it is formed with the stem H', on which is mounted a spiral spring, H². A cross-pin, H⁴, through the end of said stem, projecting through the end wall of the chamber G', keeps the plunger in its chamber.

In using this hay-rake, the driver seated in the seat B³ raises the lever F for ordinary raking, so that the rod A is disconnected from the confining cross-pin D', and is therefore free to move in the slide-bearing C. There is, therefore, now no hindrance to the relative oscillation of the frame R and the rake-frame, according to the undulations of the ground. Should, however, it suddenly become necessary to bring the points of the rake-teeth into closer contact with the ground, owing to unevenness thereof, the driver quickly lowers the lever F with his foot, hand, or knee, and at the same time grasps the operating-lever L. The cross-pin D', entering the nearest notch B of the rod A and the draw-bolt L' being disengaged from the notched segment-iron M, the lever L is instantly pressed forward and the rake-teeth depressed, as desired.

In case some obstruction or other reason arises for raising the rake-teeth, the driver pulls the lever L toward him, the prior manipulation being the same as that just described. If it is desired to elevate the teeth considerably, the operating-lever L has its draw-bolt disengaged from the segment-iron and is inclined forward some distance before the lever F is depressed. This causes the cross-pin D' to enter a notch, B, of the rod A nearer the lever L, and the latter to therefore be inclined backward to a greater angle without coming in contact with the driver. To lock the rake-teeth in any desired position, the grip-lever L² is released and the draw-bolt L' allowed to enter a notch of the segment-iron. When the rake-teeth are locked in any position, they can be instantly released by raising the lever F and thereby disconnecting the cross-pin D' from the rod A.

Instead of pivoting the rod A to the lever L and notching its opposite portion, the opposite arrangement can be made, as shown in Fig. 5. Here the rod A is pivoted to the junction of the standards C', and the operating-lever L is provided with bearings for supporting the said rod. A draw-bolt connected to said lever, a lock for holding the same in or out of engagement with the notches B of the rod A, and a foot lever or treadle for moving the draw-bolt enable the lever L to be connected to or disengaged from the rod A, as in the previously-described construction. Lateral perforations can take the place of the notches B in the rod A by substituting some such construction as that indicated in Fig. 6.

In Fig. 1 of the drawings, V² is the backing-pole of the rake at the left-hand side thereof, and V³ the hitching-beam. The hitching-beam and backing-pole for the right-hand side of the rake are not shown in this drawing; but it is of course understood that the sides of the rake are alike.

What we claim as our invention, and for which we desire Letters Patent, is as follows, to wit:

1. In a horse-rake, the combination, with a rake-frame having forwardly-projecting teeth, of a seat-frame lying in rear of the rake-frame and hinged thereto, an operating-lever pivoted to the seat-frame and swinging toward or away from the rake-frame, a connecting-rod extending from the operating-lever to the rake-frame and having one of its ends permanently pivoted to one of said parts, and a lock detachably connecting the opposite end of the rod to the other of said parts.

2. In a horse-rake, the combination, with a rake-frame having forwardly-projecting teeth and a seat-frame behind the rake-frame and hinged thereto, of an operating-lever pivoted to the seat-frame and swinging toward or away from the rake-frame, a connecting-rod having its rear end pivoted to the operating-lever and its front end supported by the rake-frame, a lock attached to the rake-frame and adapted to engage the front end of the connecting-rod and detachably fasten it to the rake-frame, and a second operating-lever pivoted to the rake-frame and adapted to operate said lock and secure or release the front end of the connecting-rod.

3. The combination, in a horse-rake, of a rake-frame having forwardly-projecting teeth, a seat-frame behind the rake-frame and hinged thereto, an operating-lever pivoted to the seat-frame and swinging toward or away from the rake-frame, a connecting-rod having its rear end pivoted to the operating-lever and its front end supported by the rake-frame, a lock attached to the rake-frame and adapted to engage the free end of the connecting-rod and detachably fasten it to the rake-frame, a lock-operating lever pivoted to the rake-frame and adapted when in one position to engage said lock with the connecting-rod and when in a different position to disconnect the lock therefrom, and a second lock attached to the rake-frame and adapted to fasten said lock-operating lever in either of said positions.

4. The combination, with the rake, of the seat-frame hinged thereto, a supporting-wheel for said frame, the operating-lever connected to said frame, a lock for said lever, a rod attached to said lever and having the notches, the slide-bearing connected with the rake and receiving said rod, the lock vertically movable in said slide-bearing and adapted to engage with the said notches, the horizontal lever connected to said lock, and a lock for holding said lever, substantially as and for the purpose set forth.

5. The combination, with the rake-frame, the seat-frame hinged thereto, the operating-lever L, and the notched connecting-rod A, pivoted thereto, of the standards C' C', attached to the rake-frame, the sliding yoke D, having the cross-pin D', the lever F, and link E, the lip H³, attached to said lever F, and the lock consisting of the chamber G', plunger H, and spring H², substantially as and for the purpose set forth.

In testimony that we claim the foregoing invention we have hereunto set our hands and seals this 14th day of May, 1886.

HORACE A. ALDEN. [L. S.]
JOHN E. KIRK. [L. S.]

Witnesses:
A. B. UPHAM,
A. KEITHLEY.